United States Patent [19]  [11] 4,155,839
Seifert et al.  [45] May 22, 1979

[54] REVERSE CENTRIFUGAL CLEANING OF PAPER MAKING STOCK

[75] Inventors: Peter Seifert; Derald R. Hatton, both of Middletown; Terry L. Bliss, Oxford, all of Ohio

[73] Assignee: The Black Clawson Company, Middletown, Ohio

[21] Appl. No.: 855,157

[22] Filed: Nov. 28, 1977

[51] Int. Cl.² .......................... D21D 5/24; B04C 5/00
[52] U.S. Cl. ......................................... 209/211; 162/4
[58] Field of Search ................... 209/211; 210/512 R; 162/4, 55

[56] References Cited

U.S. PATENT DOCUMENTS

| | | | |
|---|---|---|---|
| 2,377,524 | 6/1945 | Samson et al. | 209/211 |
| 2,975,896 | 3/1961 | Hirsch | 209/211 |
| 3,405,803 | 10/1968 | Bahr et al. | 209/211 |
| 3,861,532 | 1/1975 | Skardal | 209/211 |
| 3,912,579 | 10/1975 | Braun | 209/211 X |

*Primary Examiner*—Ralph J. Hill
*Attorney, Agent, or Firm*—Biebel, French & Nauman

[57]  ABSTRACT

A system and method for separating paper fibers from contaminants of lower specific gravities employ a reverse centrifugal cleaner wherein the inlet port is of substantially greater flow area than previously used or proposed for either normal or reverse centrifugal cleaning, each of the apex and base ports are of greater flow area than the inlet port, and the discharge flows are controlled to provide an accepts flow through the apex port which is less than the reject flow through the base port. The system provides substantial advantages over prior practice, particularly in the areas of both capital and operating costs, capacity, and cleaning efficiency in terms of the energy requirements for given tonnage of accepted fiber.

11 Claims, 3 Drawing Figures

REVERSE CENTRIFUGAL CLEANING OF PAPER MAKING STOCK

BACKGROUND OF THE INVENTION

Centrifugal cleaners have been employed for many years in the paper industry for removing small particles of higher specific gravity than paper fibers from slurries of paper making fiber, especially waste paper stocks. In centrifugal cleaners used for that purpose, in what is hereinafter referred to as "conventional centrifugal cleaning technique," the discharge outlet at the apex (tip) of the cylindrical-conical vessel is relatively small in comparison with the inlet and accepts outlets, e.g. ⅛ inch in diameter as compared with ⅝ inch diameters for the other two ports in a conventional cleaner 3 inches in diameter. In such conventional cleaning operations, therefore, the reject discharge through the apex outlet is correspondingly small in comparison with the accepts flow, e.g. 3% and 97% respectively.

In comparatively recent years, centrifugal cleaners have also been used to fractionate paper fiber slurries as well as to separate good paper fibers from contaminants of closely similar or lower specific gravities, by modifying the construction and/or operation of a conventional cleaner to provide operating conditions which cause the good fiber to be discharged through the apex outlet as the accepts flow while the lights are discharged as reject through the base (top) outlet which is the accepts outlet in conventional centrifugal cleaning. Such modified operation of centrifugal cleaners for use in fractionating mixtures of springwood and summerwood paper fibers is disclosed in Pesch U.S. Pat. No. 3,085,927 (1963) and Malm U.S. Pat. No. 3,352,745 (1967). Neither of those patents suggested any change in the flow areas of any of the ports of the conventional centrifugal cleaner referred to therein.

Grundelius et al U.S. Pat. No. 3,486,619 (1969) disclosed the use of a centrifugal cleaner for separating shives and other undesirable lightweight particles from a slurry of paper fiber by operation under controlled conditions causing the good fiber to be discharged through the apex outlet and the shives and other contaminants to be discharged through the normal accepts outlet in the base of the cleaner. Grundelius et al emphasized the importance for their purpose of maintaining the same through-flow volume which was normal for the cleaner when used for conventional cleaning purposes with respect to contaminants of higher specific gravity than paper fibers, and they suggested that the desired relative discharge flow conditions could be established and maintained by making the effective flow area of the apex outlet larger than that of the base outlet, and alternatively by means of throttling valves, preferably effective on the base outlet.

Braun U.S. Pat. No. 3,912,579 (1975) disclosed the use of a modified conventional centrifugal cleaner for the removal of certain contaminants indigenous to commercial waste paper, namely ink peppers, clays, pigment fillers and resinous materials used in coating, printing, laminating and binding. According to this patent, "reverse" centrifugal cleaning is effected in a conventional centrifugal cleaner modified by having its apex outlet enlarged to more nearly the same flow area as the base outlet, the specific diameters being ½ inch and ⅝ inch respectively for a 3-inch cleaner.

Braun disclosed that the through-flow could range from the same value used for "normal" centrifugal cleaning to considerably greater than normal, the specific examples being approximately 22 and 33.5 G.P.M. for a 3-inch cleaner, but the claims of this patent are limited to a through-flow substantially higher than normal and also to a flow through the apex outlet port at least as great as the flow through the base outlet port, the specific example being 55% accepts flow through the apex port and 45% rejects flow through the base port. In the description that follows, and also in the claims, the disclosure of the Braun patent with respect to standards of "normal" centrifugal cleaning is incorporated by reference, and in every instance where the term "normal" or "conventional" is used, it refers to such conventional, as distinguished from reverse, centrifugal cleaning and centrifugal cleaners.

Reference should also be made to the two patents issued to the assignee of the present application. Marsh et al U.S. Pat. No. 3,849,245 (1974) disclosed and claimed the use of reverse centrifugal cleaning for the purpose of eliminating grease from a slurry of paper fibers contaminated by garbage, the dimensions of the several ports in the centrifugal cleaner being of the same order as in the Braun patent. They also emphasize the use of low consistency for the stock to be cleaned, i.e. in the low end of 0.3–0.7% solids.

Raymond et al U.S. Pat. No. 3,849,246 (1974) emphasized the elimination of meltable contaminants, such particularly as grease and wax, from waste paper slurries by reverse centrifugal cleaning after heating the slurry to a temperature at which the contaminants were softened sufficiently to separate from the fibers to which they have a tendency to cling when cold. Otherwise, the disclosure of Raymond et al with respect to the dimensions and operating conditions of the reverse centrifugal cleaner closely corresponds to Marsh et al.

In summary, the state of the prior art of reverse centrifugal cleaning at the time the present invention was made was in effect that preferred operating conditions called for the use of 3-inch conventional centrifugal cleaners which had been modified by increasing the size of the apex (tip) outlet to approximately the same size as the inlet port and base (top) outlet, and also called for a higher pressure drop and through-flow rate than for normal centrifugal cleaning, with heating of the slurry being preferred when the contaminants to be eliminated were of meltable nature. The prior art patents also agreed that effective reverse centrifugal cleaning called for low consistency, namely 0.3 to 0.7% solids.

SUMMARY OF THE INVENTION

The present invention has been developed because of a recently increasing need in the secondary fiber industry for improved techniques for eliminating two major types of contaminants which occur as particles too close in size to paper fibers for eliminating by screening and whose specific gravities are not sufficiently greater than wet paper fibers for eliminating by conventional centrifugal cleaning techniques. These two classes of contaminants, which are particularly prevalent in waste corrugated paper products widely used in secondary fiber operations, are waxes and hot melt resin coatings which are of lower specific gravity than wet paper fibers, and the invention provides improved systems and processes for effectively separating such contaminants by reverse centrifugal cleaning.

In accordance with the invention, it has been discovered that some of the conditions and limitations which the prior art considered to be essential for successful reverse centrifugal cleaning were not valid, and that by modifying the characteristics and operating conditions of a reverse centrifugal cleaner, it becomes possible to effect unexpectedly better results than with the prior art practice, in a considerable number of respects including the following:

1. Higher feed consistencies as well as higher feed flows in terms of the fiber content of the supply flow.

2. Higher accepts tonnage per cleaner, due both to the higher consistency of the supply flow and a higher accepts flow in terms of gallons per minute.

3. More efficient use of the supply pumping energy by reason of the fact that the major pressure drop takes place within the cleaner itself for cleaning purposes rather than across its discharge outlets.

4. Minimum loss of energy and cleaning efficiency by reason of friction in the smaller end of the cleaner.

5. Minimum turbulence adjacent the inlet end of the inlet port with resulting improved cleaning efficiency.

6. Reduced thickener capacity requirements downstream from the cleaning station because of higher consistency of the accepts flow.

The structural characteristics of the cleaners which are employed in accordance with the invention for achieving these operating advantages include the use of substantially larger ports than previously suggested by the prior art. For example, the conventional 3-inch cleaner described by the Braun patent has an inlet port whose flow area is 0.307 square inch and a base discharge port whose flow area is also 0.307 square inch, and the only structural modification suggested by Braun was to increase the apex port to a flow area of 0.196 square inch from the 0.012 square inch size conventionally provided in such cleaners. In contrast, a 3-inch cleaner utilized to practice the invention has an inlet port whose flow area is more than twice as large as proposed by Braun, namely 0.625 square inch, and the discharge ports of such cleaner are larger by even greater factors than proposed by Braun, e.g. 0.887 and 0.994 square inch for the apex and base outlets respectively.

The practical importance of this difference in port sizes is more easily recognized by comparison of the total flow area through the discharge ports with the inlet flow area. Thus in the Braun patent, the total discharge flow area is 0.503 square inch as compared with 0.307 square inch for the inlet, or a ratio of approximately 5:3. In the preferred example of the invention, the total discharge flow area is 1.881 square inch as compared with 0.625 square inch for the inlet port, or a ratio of approximately 3:1. There is therefore correspondingly greater deceleration of the stock flow within the cleaner, so that the effect of the resulting substantial pressure drop within the cleaner is concentrated on the desired cleaning or stratifying action. Even more important is the much larger inlet port size in the cleaners of the invention, which correspondingly increases the capacity of the cleaner as well as the consistency of the stock which it can handle successfully.

Another important novel characteristic of a reverse centrifugal cleaner in accordance with the invention is the provision of an inlet port which is essentially rectangular and has its long sides parallel with the axis of the cleaner, and one short side coinciding with the base of the cleaner. This produces an inlet flow in the form of a ribbon of essentially rectangular section which enters and begins to spin within the cleaner smoothly and with a minimum of the turbulence attending the rearrangement of an entering flow of circular section to the necessary rectangular section as with the prior art cleaners. This turbulence is wasteful of supply pumping energy and also delays initiation of the stratification process within the cleaner, and the cleaner of the invention is correspondingly more efficient with respect to both pumping energy and cleaning.

The use in accordance with the invention of much larger discharge ports is also advantageous, particularly for the apex outlet for the accepted stock, which is approximately four times larger than in a cleaner constructed in accordance with the Braun patent. In the operation of the system of the invention, the desired stratification of heavy and light fibers has already taken place before the stock approaches the small end of the cleaner. At this point, the consistency of the accepted stock has increased to the point where further spinning will have minimal stratifying effect, and it simply flows out with minimum friction loss at a consistency significantly higher than that of the feed stock, e.g. 1.6 to 2.6% solids where the consistency of the feed stock is in the range of 1.0 to 1.5%.

This feeding of increased consistency as compared with the prior art is made possible by the significantly larger ports employed in the practice of the invention. Thus where the prior art teaches the necessity of low consistencies, e.g. 0.51% in Braun and less than 0.7% in Marsh et al, experimental use of the invention has established that it can be practiced successfully with feed consistencies as high as 1.5%, which provides three important practical advantages of the invention. The reduction from one-half to two-thirds of the total volumetric feed flow not only reduces the size and energy requirements of the supply pump, but it also reduces the total number of cleaners required for a given tonnage basis. Additionally, the increased consistency of the accepted stock e.g. 1.6 to 2.6% as compared with 0.82% in Braun, correspondingly reduces the needed capacity of the thickening equipment downstream from the cleaning station as well as the volume of liquid to be handled by the rest of the system.

DESCRIPTION OF THE PREFERRED EMBODIMENT

Figure 1:
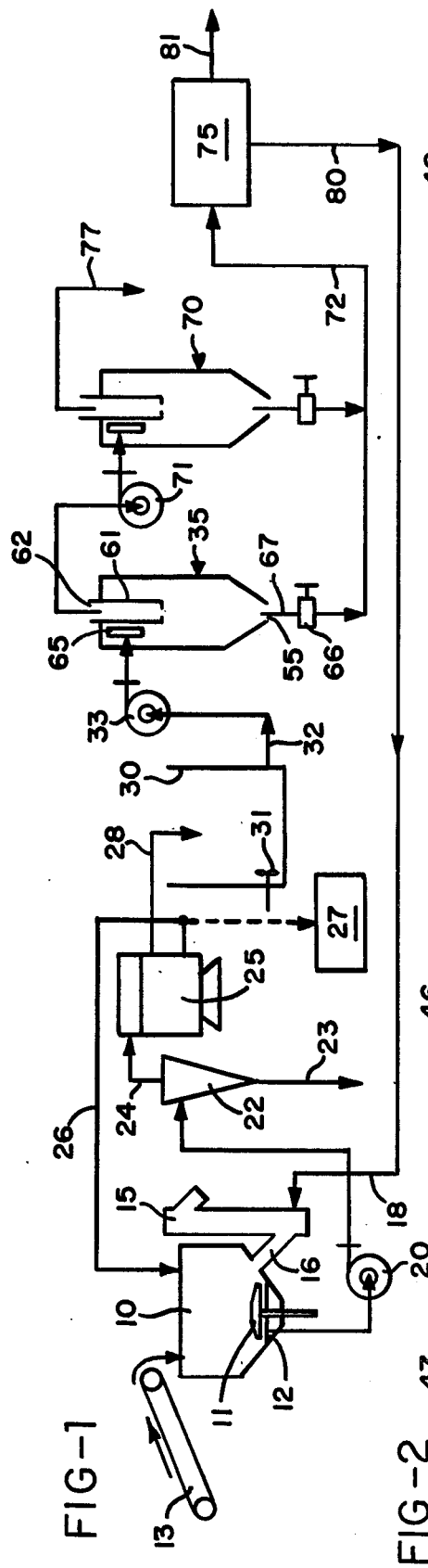
FIG. 1 is a schematic view illustrating a system for practicing the invention.

The system shown in FIG. 1 includes a pulper tub 10 wherein a rotor 11 rotates above an extraction plate 12 provided with perforations of appropriate size, commonly in the range of ½ to 1 inch in diameter. A conveyor 13 delivers waste paper material to the tub 10. A junk remover 15 is positioned adjacent the tub to receive heavy specific gravity reject material, such as tramp metal, from tub 10 through a chute 16, and water is continuously supplied to the tub by a line 18 through the junk remover 15 and the chute 16. A pulper suitable for use in the practice of the invention is shown in Felton et al U.S. Pat. No. 3,339,859, and details of the junk remover as shown in Baxter U.S. Pat. No. 3,549,092.

Commonly the pulper 10 will operate continuously, with additional waste paper and water being added at rates which will maintain the solids content of the mixture in the tub in the desired range for effective pulping, usually 3 to 6%. A slurry of water and fragmented material is continuously withdrawn from below the extraction plate 12 by a pump 20, and since this slurry can be expected to contain a significant number of particles of high specific gravity contaminants such as metal and glass, it is preferably supplied by the pump 20 to a hydrocyclone 22 for removing such contaminants for discharge from the system as indicated at 23.

The accepted slurry from the cleaner 22 is delivered by a line 24 to a screen 25, which may be of the general construction shown in Seifert et al. U.S. Pat. No. 3,970,548 and comprising a screen cylinder provided with perforations sized to accept only substantially completely defibered paper and particles of similar sizes, preferred results having been obtained with such screen wherein the perforations are in the range of 0.050 to 0.100 inch in diameter, e.g. 0.062 inch. The material rejected by screen 25 may be returned to the pulper tub 10 as indicated by the line 26, or to a reject system 27, and the accepted stock is delivered by line 28 to a storage chest 30 provided with suitable agitating means 31.

The invention is particularly concerned with treatment of the slurry in chest 30 to separate the good fiber from light constituents such especially as particles of wax and hot melt resin coatings, and also fine fiber particles. For this purpose, stock from the chest 30 is delivered by a line 32 and pump 33 to a reverse centrifugal cleaner indicated generally at 35, a typical example of such cleaner being shown in detail in FIG. 2 wherein the cleaner 35 is shown as housed in a casing 40 which has its interior divided by partitions 41 and 42 into a supply chamber 43, accepts chamber 44 and reject chamber 45, each of which is provided with its own port 46, 47 and 48, respectively.

The cleaner 35 comprises a main tubular body 50 the interior of which is cylindrical over a substantial portion of its length and frustoconical throughout its lower portion. A housing 51 is threaded on the lower end of the main body 50, and a tip piece 52 is secured within the housing 51 by a retainer nut 53 as shown. The interior of the tip piece 52 forms a continuation of the tapered interior of housing 50 and terminates in a cylindrical bore 54 leading to the discharge outlet 55.

Figure 3:
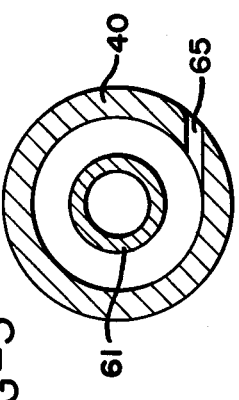
FIG. 3 is a section on the line 3—3 of FIG. 2.

The housing 51 has one or more radially arranged ports 56 which provide a total flow area larger than that of the outlet 55 leading to the interior of the accepts chamber 44, and the lower end of the housing 52 is closed by a threaded cap 57 which extends through an opening in the end wall of casing 50 and clamps the casing wall against the end of housing 51. The partition 41 is similarly clamped between the housing 52 and main body 50, and the partition 42 is clamped between the upper end of the main body 50 and the part 60 which is threaded into the upper end of the housing and includes a vortex finder 61 enclosing the discharge outlet 62 which opens into reject chamber 45. The inlet port 65 leads from the supply chamber 42 tangentially into the interior of the housing 50 as shown in FIG. 3, and it is of rectangular shape with its long sides parallel with the central axis of the housing, and with one short side coinciding with the base of the body 50.

Figure 2:
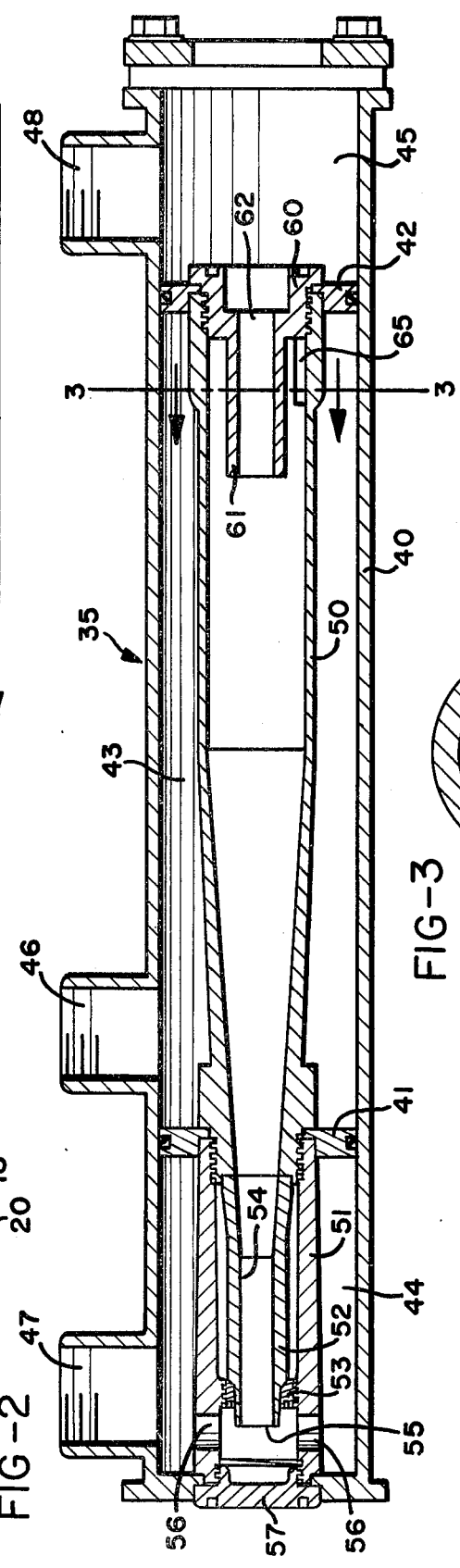
FIG. 2 is a view in axial section of a reverse cleaning unit in accordance with the invention.

In a specific example of a cleaner constructed as shown in FIG. 2 for practicing the invention, the cylindrical portion of the interior of main body 50 is 3 inches in diameter and 12 inches long, and the frustoconical portion is tapered with a total included angle of 7.3° to a discharge outlet 55 which is 1.0625 inch in diameter and therefore has a minimum flow area of 0.887 square inch. It may be advantageous to limit the axial extent of the outlet portion, by counterboring most of the outlet end of the bore 54. The discharge outlet 62 through the part 60 at the base of the cleaner is cylindrical and 1.125 inch in diameter, with a flow area of 0.994 square inch. The inlet port 65 is 0.3125 inch in width and 2 inches long, providing a cross sectional flow area of 0.625 square inch, as compared with a circular inlet port ⅝ inch in diameter which is conventional in 3-inch cleaners, and has a flow area of 0.307 square inch.

In operation, the slurry to be cleaned is delivered to the supply chamber 43 at the appropriate pressure to cause it to enter the inlet port 65 at the desired flow rate and velocity, e.g. 50 psi for 55 G.P.M. at a velocity of approximately 28 feet per second. Under these conditions under test, the pressure drops to the two outlets are respectively 40 psi to the accepts outlet 55 and 45 psi to the rejects outlet 62, and the flows through these two outlets will be respectively 45% and 55% of the feed flow, but 80-85% of the fiber will discharge through the apex outlet 55 while only 15-20% will discharge through the base outlet 62 along with the great majority of the lightweight contaminants. If these respective conditions do not result naturally with the supply flow and port dimensions outlined above, they can be maintained by appropriate back pressure control, preferably by providing a suitable throttling valve 66 on the discharge line 67 from cleaner 35 in FIG. 1.

It has been found both more effective and more efficient in the practice of the invention to utilize two or more reverse centrifugal cleaners in series as shown in FIG. 1, wherein the rejects from the cleaner 35 are delivered to a second similar unit 70 by a pump 71, with the accepts from both of these cleaners being delivered to a common line 72 leading to the next processing station 75. The reject line 77 from the cleaner 70 may optionally lead to a tertiary cleaner or discharge out of the system as reject.

The station 75 may include a conventional centrifugal cleaner if the accepted stock from the reverse cleaners 35 and 70 still retains particles of high specific gravity contaminants. It will normally also include conventional thickening apparatus from which the white water can be returned to the pulping station as indicated by the line 80 while the accepts are forwarded downstream as indicated by the line 81.

Operation of the system of FIG. 1 as described offers substantial practical advantages over the prior art in a number of respects. Thus with the inlet port 65 of the illustrated rectangular configuration, with its radially outer side merging tangentially with the inner surface of main body 50, the stock enters the cleaner as a ribbon of rectangular section which flows without interruption along the inner surface of the main body 50, and this ribbonlike flow will therefore immediately begin to spiral within the body 50 for correspondingly immediate development of centrifugal force and the resulting desired stratifying action. In contrast, in conventional cleaners wherein the inlet port is circular in section and therefore oblong at its inner end, there is substantial turbulence as the entering stock rearranges itself to rectangular shape, thereby both wasting pumping energy and delaying the commencement of centrifugal cleaning action.

This efficiency of the cleaner of the invention, coupled with the relatively large inlet and discharge ports, promotes the use of substantially higher stock consistencies, and this contributes further advantages. For example, at a consistency of 1.5% for the feed stock, which is practical with the cleaners of the invention, the volumetric flow will be only approximately one-third that of the 0.512% consistency stock disclosed in the Braun patent for the same net weight of fiber, and the consistency of the accepted stock will be approximately 2.66% as compared with 0.838% in the Braun patent. This provides a significant advantage in both the capital cost of the supply pump and the energy required to operate it. Similarly, the thickener requirements of the Braun system are approximately 2½ times those of the thickener apparatus at the station 75 in the system of FIG. 1, which contributes corresponding economics in the cost of the capital equipment needed at the thickener station.

In addition to handling substantially higher consistency stock than prior art reverse cleaners, the volumetric rate of flow for the cleaner of the invention is also substantially higher than in the prior art, by a factor of more than 2 for the same inlet pressure as shown by comparison of the flow area of 0.625 square inch for the inlet port 55 as compared with the 0.307 square inch for the inlet port in the Braun patent. In the example or preferred operating conditions given above, however, using the same diameter cleaner as Braun, the inlet pressure was only 50 psi as compared with 90 psi in Braun, while the flow rate was 55 gallons per minute as compared with 33.5 in Braun, thereby requiring correspondingly lower power while still handling approximately four times the amount of fiber in the same time interval. Thus in terms of tonnage of fiber per cleaner, the invention offers an increase by a factor of as much as 6 over the teaching of the Braun patent for the same inlet pressure and flow conditions, and substantially more efficient operation at lower inlet pressures.

The significantly higher efficiency of the reverse cleaning system of the invention is also contributed to in other ways by the design of the cleaner itself. For example, the large discharge ports minimize friction losses in flowing therethrough which waste pumping energy, and the relatively low velocity discharge flow as well as low velocity spinning of the accepts stock as it approaches the accepts outlet 55 mean that the primary effect of the pressure drop within the cleaner is devoted to cleaning, particularly in the cylindrical portion of the cleaner where the stock consistency is lowest and where the cleaning action begins immediately by reason of the ribbon-like inlet flow as already described.

In summary, reverse centrifugal cleaning in accordance with the invention provides significant practical advantages over the prior art in the important areas of both capital and operating costs, in at least all of the following respects:

(a) reduced pumping energy on the basis of tonnage of accepted fiber;

(b) higher yields in terms of tonnage of accepted fiber per day for the same volume of feed stock, (c) reduced total numbers of cleaners on the basis of tonnage of accepted fiber per day, (d) reduced requirements of thickener capacity on the basis of tonnage of accepted fiber per day, (e) improved cleaning efficiency in terms of the energy requirements for given tonnage of accepted fiber.

The invention has been developed in connection with 3-inch cleaners as described above, and the specific dimensions, pressures and other values noted in connection with the description of the preferred embodiment of the invention have been found to produce the series of unexpectedly substantial advantages discussed. The principles of the invention defined herein are believed to be applicable to cleaners of other sizes so long as the relationships of the several factors described in connection with a 3-inch cleaner are substantially retained.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. In a system for separating paper making fibers from light contaminants of lower specific gravities, the combination of:
    (a) means for forming a pumpable aqueous slurry wherein the solid constituents consist essentially of paper fibers and one or more light contaminants such as wax and plastic fragments similar in size and not sufficiently greater in specific gravity than wet paper fibers for separation by conventional centrifugal cleaning technique,
    (b) a cylindrical-conical vessel having a tangentially arranged inlet port adjacent the base thereof and having outlet ports in the apex and base thereof,
    (c) said inlet port being substantially larger in flow area than the inlet port normally used in a conventional centrifugal cleaner of the same diameter,
    (d) each of said apex and base ports being of greater flow area than said inlet port to provide a total outlet port flow area substantially greater than said inlet port,
    (e) means for supplying said slurry to said inlet port at a sufficiently high flow rate and under sufficient pressure to develop in said vessel centrifugal force conditions causing vortical separation of said slurry within said vessel into an outer fraction containing the large majority of the paper fibers and an inner fraction containing the large majority of said light contaminant materials, and to cause discharge flows of said outer and inner fractions through said apex and base ports respectively at an aggregate through flow rate substantially higher than is normal for conventional operation of a centrifugal cleaner of the same diameter, and
    (f) means for separately receiving said discharge flows.

2. The system defined in claim 1 further comprising control means for maintaining said discharge flows through both of said outlet ports in predetermined relation such that the portion of said outer fraction discharged through said apex port as accepted stock constitutes less than one-half of said supply flow.

3. The system defined in claim 2 wherein said control means comprises a discharge line from said apex port, and valve means regulating the flow through said line.

4. A system as defined in claim 1 wherein said inlet port is rectangular and has two sides parallel with the central axis of said vessel and a third side coinciding with the base of said vessel to deliver an essentially ribbon shaped flow of stock to said vessel.

5. A system as defined in claim 4 wherein said inlet is at least twice as large in flow area as the inlet port normally used in a conventional centrifugal cleaner of the same diameter.

6. The process of separating paper making fibers from light contaminants of lower specific gravities which comprises the steps of:
 (a) forming a pumpable aqueous slurry wherein the solid constituents consist essentially of paper fibers and one or more light contaminants such as wax and plastic fragments similar in size and not sufficiently greater in specific gravity than wet paper fibers for separation by conventional centrifugal cleaning technique,
 (b) Supplying said slurry to a cylindrical-conical vessel having a tangentially arranged inlet port adjacent the base thereof and having outlet ports in the apex and base thereof,
 (c) said inlet port being substantially larger in flow area than the inlet port normally used in a conventional centrifugal cleaner of the same diameter,
 (d) each of said apex and base ports being of greater flow area than said inlet port to provide a total outlet port flow area substantially greater than said inlet port,
 (e) maintaining the supply flow to said inlet port sufficiently high and under sufficient pressure to develop in said vessel centrifugal force conditions causing vortical separation of said slurry within said vessel into an outer fraction containing the large majority of the paper fibers and an inner fraction containing the large majority of said light contaminant materials, and to cause discharge flows of said outer and inner fractions through said apex and base ports respectively at an aggregate through flow rate substantially higher than is normal for conventional operation of a centrifugal cleaner of the same diameter, and
 (f) separately recovering discharge flows.

7. The process defined in claim 6 comprising the further step of applying sufficient back pressure to said discharge flow through said apex port to assure that the portion of said outer fraction discharged through said apex port as accepted stock constitutes less than one-half of said supply flow.

8. The process defined in claim 6 wherein the pressure under which the supply flow to said inlet port is maintained is not substantially higher than the inlet pressure normally used in a conventional centrifugal cleaner of the same diameter.

9. A reverse centrifugal cleaner comprising:
 (a) a cylindrical-conical vessel having a tangentially arranged inlet port adjacent the base thereof and having outlet ports in the apex and base thereof,
 (b) the cylindrical portion of said vessel being of conventional inner diameter,
 (c) said inlet port being of substantially greater flow area than the inlet port conventionally used in cleaners of said inner diameter, and
 (d) each of said apex and base ports being of greater flow area than said inlet port to provide a total outlet port flow area substantially greater than said inlet port.

10. A reverse centrifugal cleaner as defined in claim 9 wherein the inner diameter of said vessel is substantially three inches, and the flow area through said inlet port is not substantially less than 0.625 square inch.

11. A reverse centrifugal cleaner as defined in claim 9 wherein said inlet port is rectangular and has two sides parallel with the central axis of said vessel and a third side coinciding with the base of said vessel to deliver an essentially ribbon shaped flow of stock to said vessel.

* * * * *